June 21, 1949.　　　　　E. A. PARMANN　　　　　2,473,660
WELDED STRUCTURE AND METHOD OF ASSEMBLING SAME
Filed Feb. 12, 1947
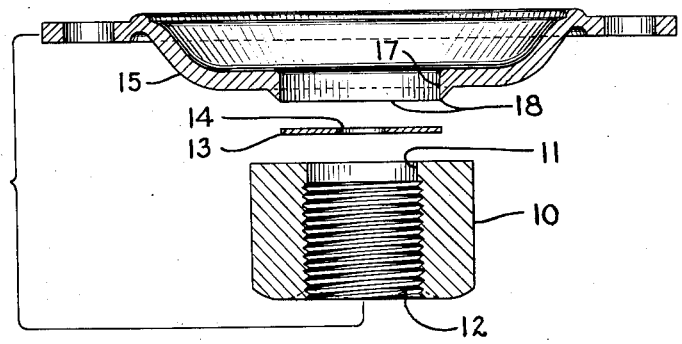
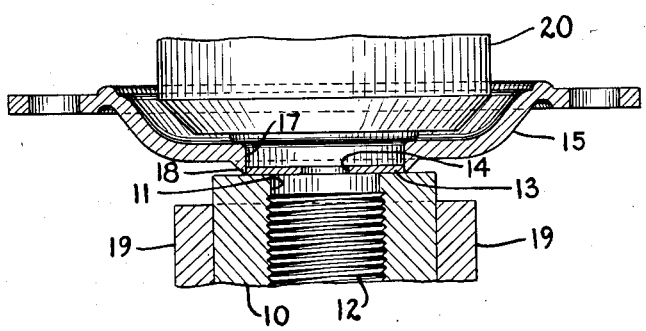
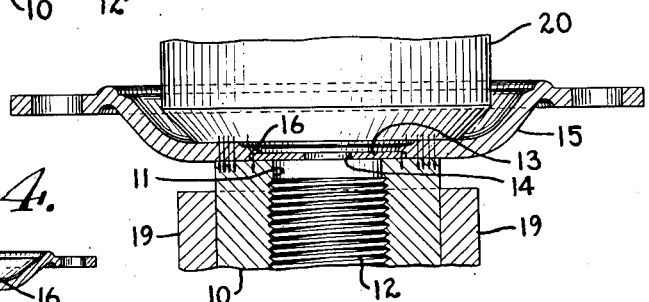
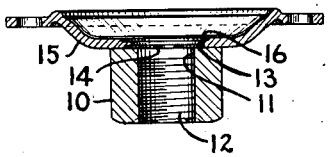
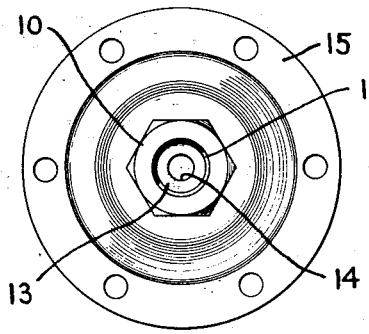
INVENTOR.
E. A. Parmann
BY
Lieber & Lieber
ATTORNEYS.

Patented June 21, 1949

2,473,660

UNITED STATES PATENT OFFICE 2,473,660

WELDED STRUCTURE AND METHOD OF ASSEMBLING SAME

Edwin A. Parmann, Batavia, Ill., assignor to Furnas Electric Company, Batavia, Ill., a corporation of Illinois Application February 12, 1947, Serial No. 728,024

5 Claims. (Cl. 285—25)

1

My present invention relates generally to improvements in the art of fabrication by welding, and relates more particularly to improvements in the construction and method of assembling tubular members having end flange-like elements firmly associated therewith.

A primary object of the present invention is to provide an improved welded structure which is simple and extremely durable in construction, and an improved method of producing the same in a highly efficient and practical manner.

In the commercial manufacture of switches such as shown, for example, in U. S. Patent No. 2,193,126, granted March 12, 1940, to William C. Furnas considerable difficulty has heretofore been encountered in satisfactorily attaching the fluid pressure supply pipe, or the threaded nut for receiving such pipe, to the lower plate of the diaphragm enclosure. It has heretofore been customary to fasten these parts together by brazing and/or riveting, but such prior methods were not entirely satisfactory because they were expensive and impractical from a production standpoint and the resultant assemblages were not uniformly secure and sufficiently integrally united. Various attempts have also heretofore been made at welding the so-called "air nut" for receiving the fluid pressure supply pipe to the diaphragm enclosure plate, but these attempts have also been unsuccessful for various reasons. When the parts are united by ordinary known welding methods, it has been found that the resultant welds are likewise not uniformly secure, and furthermore during the usual welding process the molten metal is caused to sputter and splash into the central aperture of the diaphragm enclosure plate and into the screw-threaded air nut, thereby necessitating additional subsequent machining.

It is therefore a more specific object of the present invention to provide an improved diaphragm enclosure plate and air nut assemblage which is exceedingly and uniformly strong and secure and which may be produced in large quantities and at low cost by welding in accordance with an improved method.

Another specific object of this invention is to provide an improved article of manufacture comprising, a member having a bore provided with a constriction formed by a second member integrally united therewith in a novel and efficient manner.

Another specific object of my invention is to provide an improved method of welding an end flange-like element to a member having a bore to firmly unite the same and provide an extremely

2 durable assemblage without causing undesirable metal deposits within the bore during the welding operation.

An additional specific object of my present invention is to provide an improved diaphragm enclosure plate and air nut assemblage for pressure actuated switches which may be readily commercially produced in a highly practical manner by the use of projection welding in accordance with an improved method.

A further specific object of the present invention is to provide an improved method of producing a strong, durable and highly efficient unitary diaphragm enclosure plate and air nut assemblage for pressure switches with a minimum number of simple operations.

Still another specific object of the present invention is to provide an improved method of forming a constricted passageway at the end of a tubular member while simultaneously permanently uniting a flange-like element to the same end of the tubular member by welding.

These and other specific objects and advantages of the present invention will be apparent from the following detailed description.

A clear conception of the features constituting my present improvement, and of the construction and use of typical articles embodying the invention and produced in accordance with my improved method, may be had by referring to the drawing accompanying and forming a part of this specification, wherein like reference characters designate the same or similar parts in the several views.

Fig. 1 is an exploded central transverse cross-sectional view of typical parts prior to assembly thereof in accordance with my invention;

Fig. 2 is a similar transverse cross-section of the same parts in position between fragments of the welding electrodes just prior to application of welding current;

Fig. 3 is another similar transverse cross-section of the parts at the moment of completion of the welding operation;

Fig. 4 is a somewhat reduced transverse central section through a finally completed welded assemblage; and Fig. 5 is a similarly reduced bottom view of the completed unit.

While the invention has been shown and described herein as applied to and embodied in a typical diaphragm enclosure plate and air nut assemblage for pressure actuated switches, it is not my desire or intention to thereby unnecessarily restrict the scope or utility thereof, since the improvement may obviously be applied to and utilized with other types of structures.

Referring to the drawing, the improved assemblage, shown therein by way of illustration, comprises in general, a tubular member or nut 10 having the bore 11 thereof provided with screw threads 12; a plate member or disk 13 of somewhat lesser width or diameter than the member 10 but of greater diameter than the bore 11 disposed at an end of the tubular member 10, the plate member 13 having an aperture or central bore 14 of lesser diameter than the bore 11 to form a constricted passage at the end thereof; and a flange-like member or diaphragm enclosure plate 15 surrounding the plate or disk 13 and integrally united by the application of welding heat and pressure to the adjacent end of the tubular member 10 beyond the outer periphery of the plate 13, a portion of the flange member 15 adjacent to and immediately surrounding the plate 13 being forced inwardly over the outer peripheral edge of the plate 13 as at 16 during the pressure welding operation to firmly and securely unite the tubular member 10 and the plate member 13 entirely about the bore 11 so as to provide an integral rigid assemblage.

In the present typical assemblage, the flange member 15 is what is commonly known as a diaphragm enclosure plate and as such it is adapted to be secured to the lower end of a pressure switch casing in the manner shown in Patent No. 2,193,126, hereinabove referred to; and the internally threaded tubular member 10 is known to those skilled in the art as an air nut and forms the threaded connection for the fluid pressure supply pipe, also shown in Patent No. 2,193,126.

In assembling and producing the improved articles in accordance with my present method, the member 15 is first provided with a central through opening or bore 17 of such size as to permit relatively snug reception of the plate or disk 13 therein, and with a relatively sharp and narrow depending annular ridge or projection 18 entirely surrounding the opening 17. The parts are then juxtaposed as in Fig. 2 with the disk or washer 13 received in the bore 17 of the member 15 and surrounded by the depending portion 18, the disk 13 and the annular knife-like edge of the projection 18 being placed directly against an end of the tubular member 10. The tubular member or nut 10 is then caused to contact a stationary electrode 19, after which a cylindrical movable electrode 20 is brought against the flange member or enclosure plate 15; and with the parts in position between the stationary electrode 19 and the movable electrode 20, as above described and as clearly shown in Fig. 2, the welding current is turned on and simultaneously with the flow of welding current from the movable electrode 20 through the parts to the stationary electrode 19, pressure is applied to the member 15 by the movable electrode 20. During this welding operation under pressure, the welding current flows as indicated by the arrows in Fig. 3, the major flow of current being in the region beyond the outer periphery of the disk 13 since there is a more direct path for flow of current through this region; and as this flow proceeds and pressure is applied, the projection 18 of the flange member 15 melts and a substantial portion of this metal is caused to flow inwardly over the outer peripheral edge of the disk 13 as at 16 in Figs. 3 and 4, and this metal portion 16 is, of course, fused to some extent by the welding current to the disk 13.

It is to be noted that although in actual commercial practice, the air nut 10 and the enclosure plate 15 are formed of steel and the disk or washer 13 is formed of stainless steel which has a high electrical resistance, these parts may however be formed of other suitable materials; and satisfactory assemblages have in fact been produced which embody the use of disks 13 of phosphor bronze which has a low electrical resistance and of mica which is an insulator. It should, of course, be understood that the parts are cleaned and otherwise prepared in the customary manner prior to the welding operation, and the electrodes 19, 20 are of the usual type used in projection welding. Upon completion, the improved devices, assembled in accordance with the new method, are extremely strong and durable with the enclosure plate 15 of each unit integrally united by the welding operation to the air nut 10 entirely around the periphery of the disk 13.

From the foregoing detailed description, it is apparent that the present invention provides an improved welded structure which is simple and extremely durable in construction, and an improved method of producing the same in a highly efficient and practical manner. During the welding operation, the current flows through the parts as indicated, melting the annular projection 18 which is caused by pressure to overlap the disk 13 entirely around its outer peripheral edge, and due to the resistance of the disk 13 and/or the resistance between the metal surfaces of the parts, coupled with the fact that there is a more direct path for flow of current through the region beyond the outer periphery of the disk 13, considerably more heat is produced along the outer surface of the air nut 10 and an excellent and uniform union by welding between the members 10 and 15 results. Furthermore, during the welding operation, the molten metal is prevented from spilling or flowing into the bore 11 of the member 10 and the internal threads 12 thereof are thus protected from damage during assembly. It should also be noted that the present invention not only provides an improved practical and simple method of rigidly uniting an end flange-like member to a tubular element by welding and without causing undesirable metal deposits in the bore of the tubular member during production, but it also contemplates simultaneous provision of a constricted passage at the end of the tubular member. Diaphragm enclosure plate and air nut assemblages commercially produced in accordance with the improved method have proven to be strong, durable and highly efficient and a minimum number of operations in such method has enabled quantity production of these assemblages at reduced cost.

It should be understood that it is not desired or intended to limit this invention to the exact details of construction or to the precise method of assembling or mode of utilizing the improved assemblages, herein shown and described, for various modifications within the scope of the appended claims, may occur to persons skilled in the art to which this invention pertains.

I claim:

1. An article of manufacture comprising, a member having a bore, a plate-like member of lesser width than that of said first-mentioned member but wider than said bore, said plate member being disposed near an end of said first member and having an aperture of lesser diameter than said bore to form a constricted passage, and a flange-like member surrounding said plate member and being integrally united by welding to said first member, said flange member having a portion thereof extending inwardly over the outer edge of said plate member to securely unite said plate member to said first member and provide an integral structure.

2. An article of manufacture comprising, a tubular member, a plate-like member of lesser width than that of said tubular member but wider than the bore thereof, said plate member being disposed at an extreme end of said tubular member and having an aperture of lesser diameter than the bore thereof to form a constricted passage, and a flange-like member surrounding said plate member and being integrally united by welding to the extreme end of said tubular member entirely around said plate member, said flange member having a portion thereof extending inwardly over the outer edge of said plate member to securely unite said plate member to said tubular member and provide an integral structure.

3. An article of manufacture comprising, a tubular member, a disk of lesser diameter than said tubular member but of greater diameter than the bore thereof, said disk being disposed directly against an end of said tubular member and having a central opening therethrough of lesser diameter than the bore thereof to form a constricted passage, and a flange-like element having a bore for snugly receiving and embracing said disk and being integrally united to said tubular member beyond the periphery of said disk by welding, said flange element having an integral portion thereof adjacent its bore overlapping the entire outer peripheral edge of said disk to securely unite said disk to said tubular member and provide an integral structure.

4. The method of producing a tubular member having an integral flange-like element at an end thereof, which comprises, forming a relatively flat member of lesser width than the tubular member but wider than the bore thereof with an aperture of smaller diameter than the bore of said tubular member, providing a bore in the flange-like element of a size such as to permit reception of said flat member and with a ridge of excess material surrounding said bore of the flange-like element, thereafter positioning the parts so that the flat member is received within the bore of said flange element and with both the flat member and the ridged portion of the flange element resting directly against an end of said tubular member, and finally uniting the parts by welding and simultaneously applying pressure causing the ridged portion of the flange element to melt and overlap the outer edge of said flat member and directly uniting said tubular member and said flange element outwardly beyond said flat member.

5. The method of producing a tubular member having an integral flange-like element at an end thereof, which comprises, forming a disk of lesser diameter than the tubular member but of greater diameter than the bore thereof with a central aperture of smaller diameter than the bore of said tubular member, providing a bore in the flange-like element of slightly larger diameter than the diameter of said disk and with an annular depending relatively narrow ridge of excess material immediately adjacent to and entirely surrounding said bore of the flange element, thereafter placing said disk within the bore of said flange element and positioning the parts so that the disk and the surrounding depending ridge portion of the flange element are both resting directly against an end of said tubular member, and finally uniting the parts by welding under pressure to cause the ridged portion of the flange element to melt and be forced over the outer peripheral edge of said disk and directly uniting said tubular member and said flange element beyond the outer periphery of said disk.

EDWIN A. PARMANN.

REFERENCES CITED

The following references are of record in the file of this patent:

UNITED STATES PATENTS

| Number | Name | Date |
|---|---|---|
| 703,657 | Horn | July 1, 1902 |
| 1,604,531 | Murray | Oct. 26, 1926 |
| 1,865,926 | Laing | July 5, 1932 |
| 2,121,984 | Rieger | June 28, 1938 |
| 2,202,405 | Smith | May 28, 1940 |
| 2,273,306 | Woods | Feb. 17, 1942 |
| 2,372,772 | Ellis et al. | Apr. 3, 1945 |